United States Patent [19]
Olson, Sr. et al.

[11] 3,980,025
[45] Sept. 14, 1976

[54] CONVERTIBLE RAIL-HIGHWAY VEHICLE

[75] Inventors: Buford W. Olson, Sr.; Eldrid W. Nelson; Albin A. Davidson, all of Minneapolis, Minn.

[73] Assignee: Chas. Olson & Sons Incorporated, Minneapolis, Minn.

[22] Filed: Dec. 11, 1974

[21] Appl. No.: 531,683

[52] U.S. Cl. .................. 105/215 C; 104/245
[51] Int. Cl.² .................. B61D 15/00; B61F 9/00; B61F 13/00; B62D 61/12
[58] Field of Search .................. 105/215 C; 104/245

[56] References Cited
UNITED STATES PATENTS

| | | | |
|---|---|---|---|
| 3,228,350 | 1/1966 | Cox | 105/215 C |
| 3,263,628 | 8/1966 | Grove et al. | 105/215 C |
| 3,638,580 | 2/1972 | Yard | 105/215 C |
| 3,638,581 | 2/1972 | Yard | 105/215 C |
| 3,653,332 | 4/1972 | Olson, Sr. et al. | 105/215 C |
| 3,701,323 | 10/1972 | Cox | 105/215 C |
| 3,738,285 | 6/1973 | Olson, Sr. et al. | 105/215 C |
| 3,763,789 | 10/1973 | Olson, Sr. et al. | 105/215 C |

*Primary Examiner*—L. J. Paperner
*Assistant Examiner*—Howard Beltran
*Attorney, Agent, or Firm*—H. Dale Palmatier

[57] ABSTRACT

A combination highway and rail vehicle having front and rear sets of tires and front and rear sets of rail guide wheels. The front guide wheels are carried by a wheel suspension which swings the guide wheels into contact with the rails forwardly of the front tires and simultaneously raises the front tires, against the force of tire suspension springs, to positions above the rails. As a result, the front tires, which may be wider apart than the rails, are lifted out of the way, and the rear tires of the vehicle are required to carry a substantially greater portion of the weight of the vehicle plus its load, thereby increasing the traction between the rear tires and the rails.

8 Claims, 7 Drawing Figures

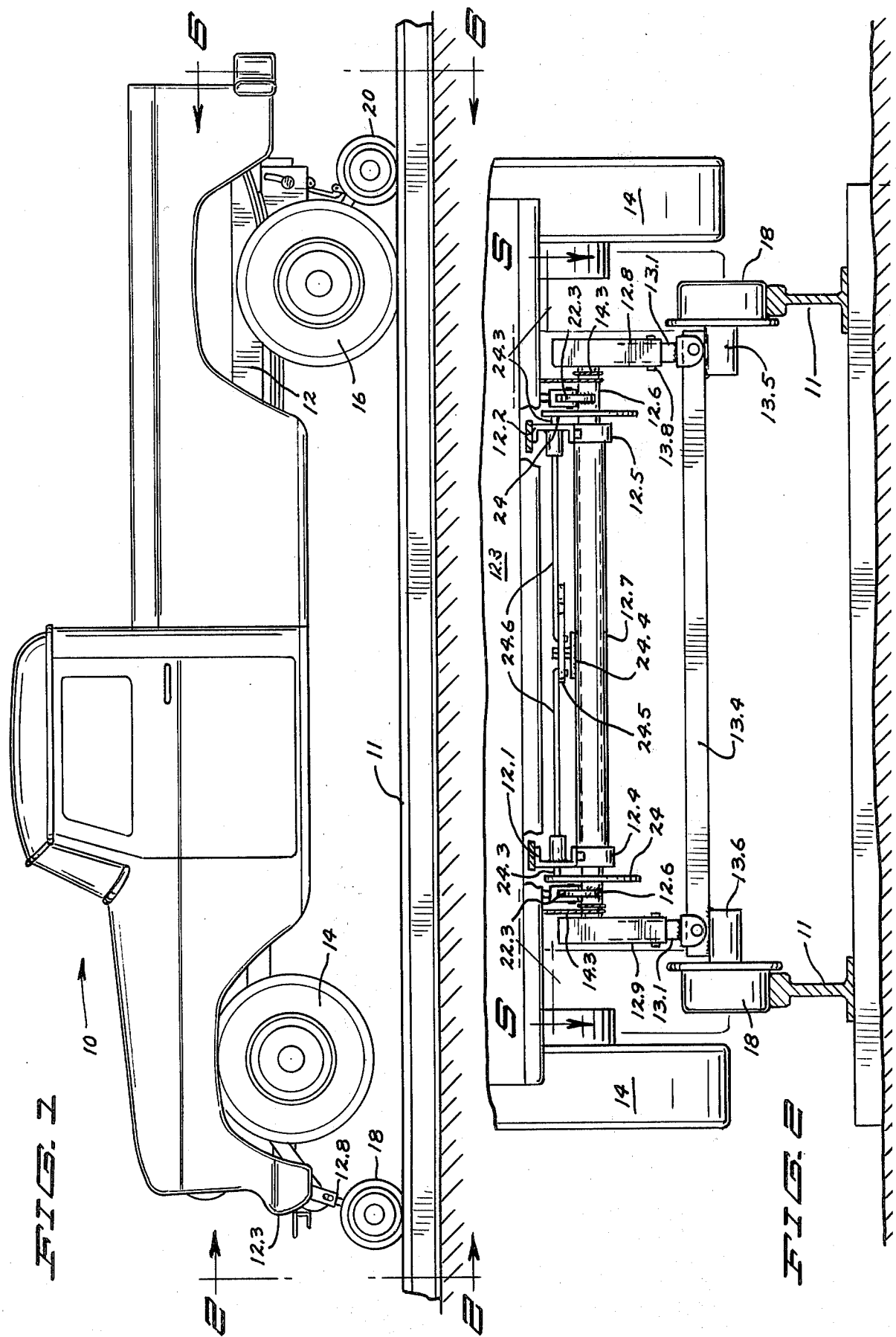

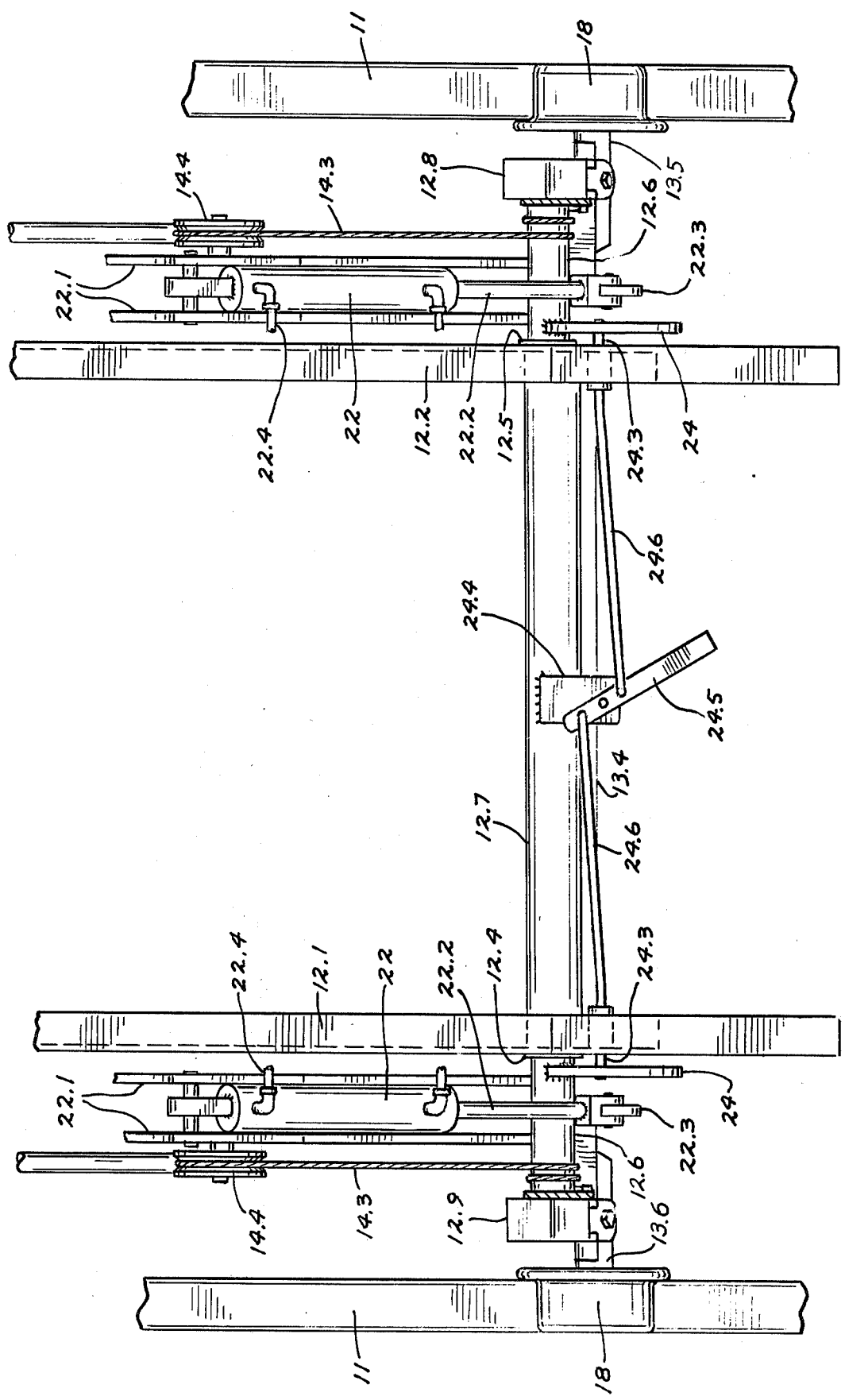

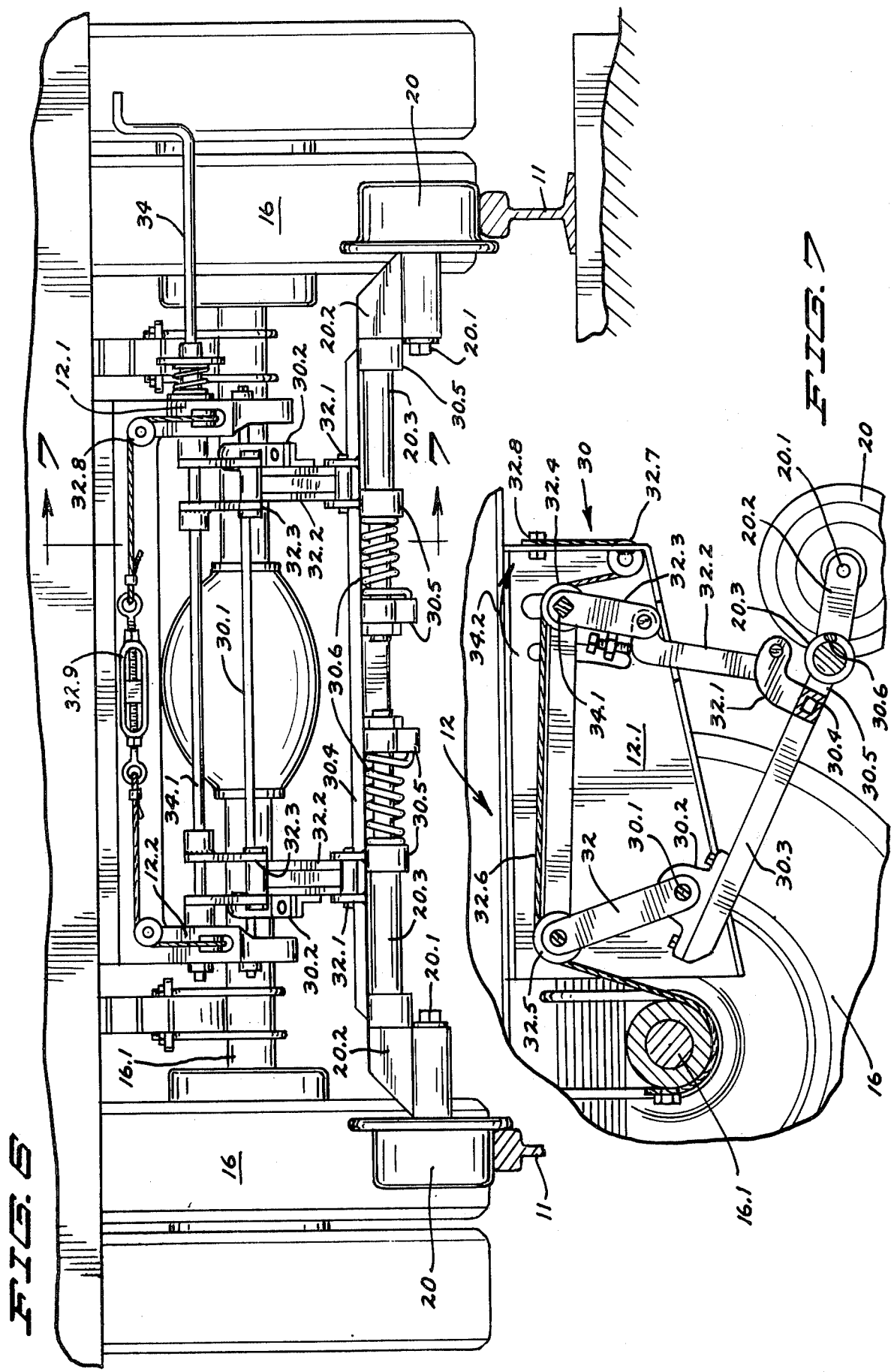

CONVERTIBLE RAIL-HIGHWAY VEHICLE

BACKGROUND OF THE INVENTION

The invention relates to combination rail and highway vehicles; that is, vehicles which can operate both on the highways using rubber tires, and on the rails of railroad tracks using guide wheels to guide the vehicles on the rails. Vehicles of this general type are shown in commonly owned U.S. Pat. Nos. 3,738,285; 3,763,789 and 3,653,332. Such vehicles are provided at their front and rear ends with guide rails for riding along rails with the front and rear tires of such vehicles riding upon the rails to drive and brake the vehicles.

With medium sized vehicles, such as passenger automobiles, the front and rear tires may be adjusted inwardly slightly toward one another so as to come into contact with the rails of a standard railroad track. The rails of a track of standard gage are separated, center-to-center, by approximately 59.5 inches. However, the center-to-center distance between the front tires of larger vehicles, such as heavy trucks, may be, for example, on the order of 75.2 inches. From a practical standpoint, it is nearly impossible to adjust the front wheels of large, heavy trucks so as to match the rail-to-rail distance between the rails of a standard track. On the other hand, the tires of the truck must have good traction on the rails to provide motive power and braking. Further, in order to maintain good tire alignment for safe operation of a truck on the highway, it is desirable that the front suspension system of the truck be subjected to as little tampering as possible.

A combination rail and highway vehicle, with wideset front tires and with good traction to rails is greatly to be desired.

BRIEF SUMMARY OF THE INVENTION

The invention relates to a combination highway and rail vehicle having a frame, front and rear axles mounting sets of front and rear tires through suspension springs to the frame for running on the highway, and front and rear rail guide wheels. The vehicle includes rear guide wheel mounting means enabling rear rail guide wheels to come into contact and bear downwardly upon the rails of a railroad track with substantially constant force regardless of the weight borne by the rear vehicle axle. A front rail guide wheel suspension is provided and includes mounting means for mounting the front guide wheels to the frame and permitting the latter wheels to be moved downwardly into contact with rails forwardly of the front tires. The front guide wheel suspension also includes retraction means for concurrently retracting the front tires upwardly above the rails against their suspension springs, all of which results in a greater proportion of the vehicle weight to be carried by the rear tires to increase the traction thereof to the rails for braking and motive power.

In one embodiment, the front guide wheel suspension includes a transverse, frame-mounted rocker arm, front guide wheel axles mounting the guide wheels, and support arms connecting the guide wheel axles to the rocker arm forwardly of the front tire axle of the vehicle. Hydraulic means are provided for rotating the rocker arm so as to swing the front guide wheels downwardly into contact with the rail. Also provided are means responsive to such rotation of the rocker arm to simultaneously raise the front tires of the vehicle against the force of tire suspension springs into positions above the level of the rails, with the result that the weight of the vehicle is supported in the front by the front rail guide wheels rather than the front tires, and at the rear by the rear tires and rear guide wheels. The spacing of the front guide wheels forwardly of the front tire axle of the vehicle results in a greater proportion of the vehicle load being borne by the rear tires, thereby improving traction between the latter tires and the rails.

BRIEF DESCRIPTION OF THE DRAWINGS

FIG. 1 is a side view of a combination highway and rail vehicle of the invention, shown in position for riding on rails;

FIG. 2 is a broken away, front view taken along line 2—2 of FIG. 1;

FIG. 5 is a broken away view taken along line 5—5 of FIG. 2;

FIG. 6 is a rear view taken along line 6—6 of FIG. 1 and showing the rear guide wheel suspension; and FIG. 7 is a side view, partially broken away and in partial cross section, taken along line 7—7 of FIG. 6.

DETAILED DESCRIPTION OF THE PREFERRED EMBODIMENT

Figure 3:
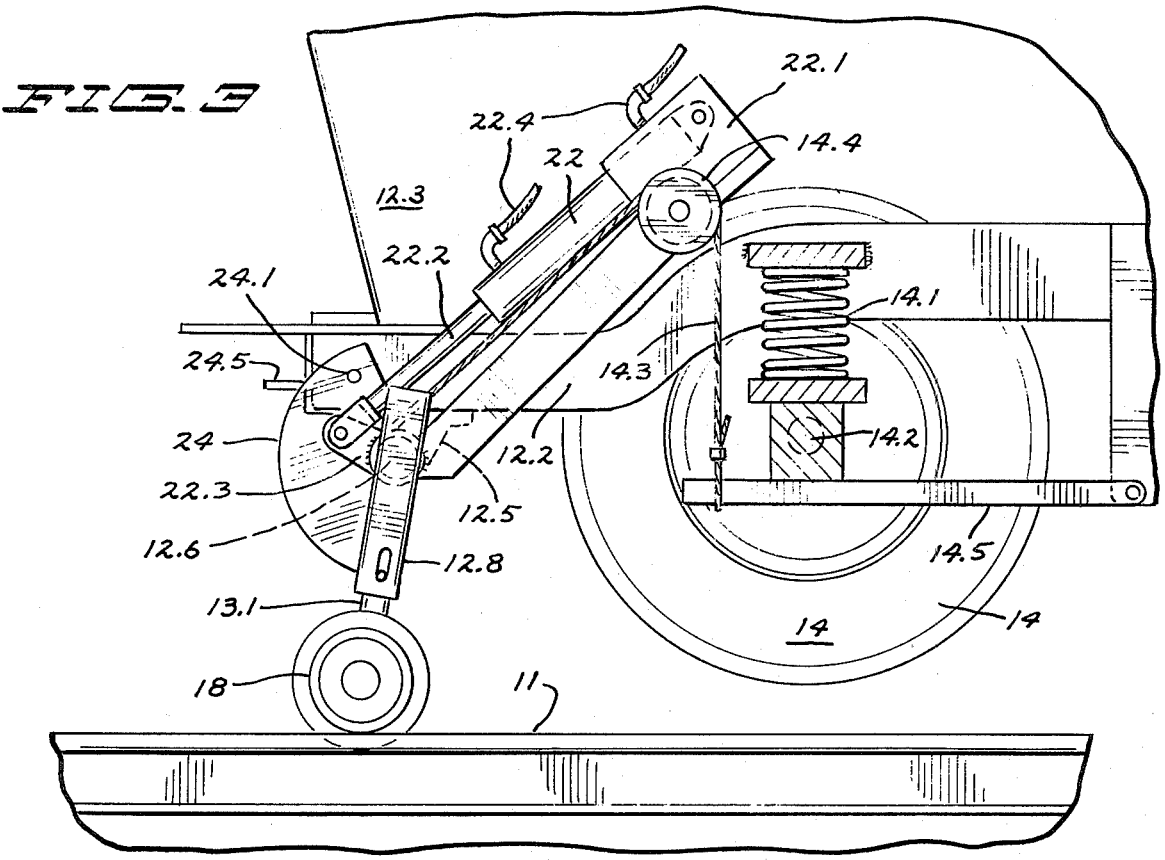
FIGS. 3 and 4 are side view of the front guide wheel suspension of the vehicle of FIG. 1, FIG. 3 showing a guide wheel in its rail engaging position, and FIG. 4 showing the guide wheel in its retracted position.

A combination highway and rail vehicle is shown in FIG. 1 as 10, the truck including a frame designated 12, and front and rear axles mounting front and rear sets of rubber tires 14, 16, and rail guide wheels 18, 20, located at the front and rear of the vehicle, respectively. The rear guide wheels 20 are pressed down with substantially constant force upon the rails 11, and the rear tires 16 are in driving contact with the rails. As shown, the vehicle may be provided with dual rear tires, with only the inner tires in contact with the rails. At the front of the vehicle, the front rubber tires 14 are elevated above the level of the rails 11, and only the front rail guide wheels 18 are in contact with the rail. As shown in FIG. 2, the front tires 14 of the vehicle are spaced well outside the rails.

With reference to FIGS. 2 – 5, longitudinal beams of the vehicle frame are designated generally as 12.1, 12.2, and are extended forwardly beneath the front bumper 12.3 of the vehicle. To the front of the beams 12.1, 12.2 are attached bearings 12.4, 12.5, and a rocker arm 12.6 is received within the bearings and extends transversely of the front of the vehicle. If desired, a portion of the rocker arm between the bearings 12.4, 12.5 may be covered with a protective shield or tube 12.7, affixed to the beams 12.1, 12.2.

Support arms 12.8, 12.9 are attached rigidly to the respective ends of the rocker arm 12.6 for movement in generally vertical planes as the rocker arm rotates. As shown best in FIG. 4, each support arm includes an outer tube 13 having an open end within which is received a rod 13.1 in telescoping fashion, the other end of the tube 13 being closed by a plate 13.2. The inner surface of the plate 13.2 serves as a spring seat against which an internal helical spring 13.3 bears at one end. The other end of the spring bears outwardly upon the confronting surface of the rod 13.1. At its outer end, the rod 13.1 of each of the support arms 12.8, 12.9 is welded or otherwise affixed to a transverse support bar 13.4 (FIG. 2), the support bar in turn being mounted to guide wheel axles 13.5, 13.6 which respectively rotatably mount the rail guide wheels 18. The transverse bar 13.4 maintains the guide wheels the proper distance apart for contacting the rails 11, as shown best in FIG. 2. The outer wall of the tube 13 of each of the support arms 12.8, 12.9 is slotted, as shown at 13.7 in FIG. 4, and the inner rod 13.1 is provided with a pin 13.8 which extends through the slot on either side to prevent the rod 13.1 from separating from the tube 13. The support arms 12.8, 12.9 are held closely parallel to one another by the transverse support bar 13.4, and the springs 13.3 continuously urge the guide wheels 18 against the rails upon which it rides so as to maintain substantially continuous contact between the wheels and rails as the wheels follow undulations in the rails.

Figure 4:
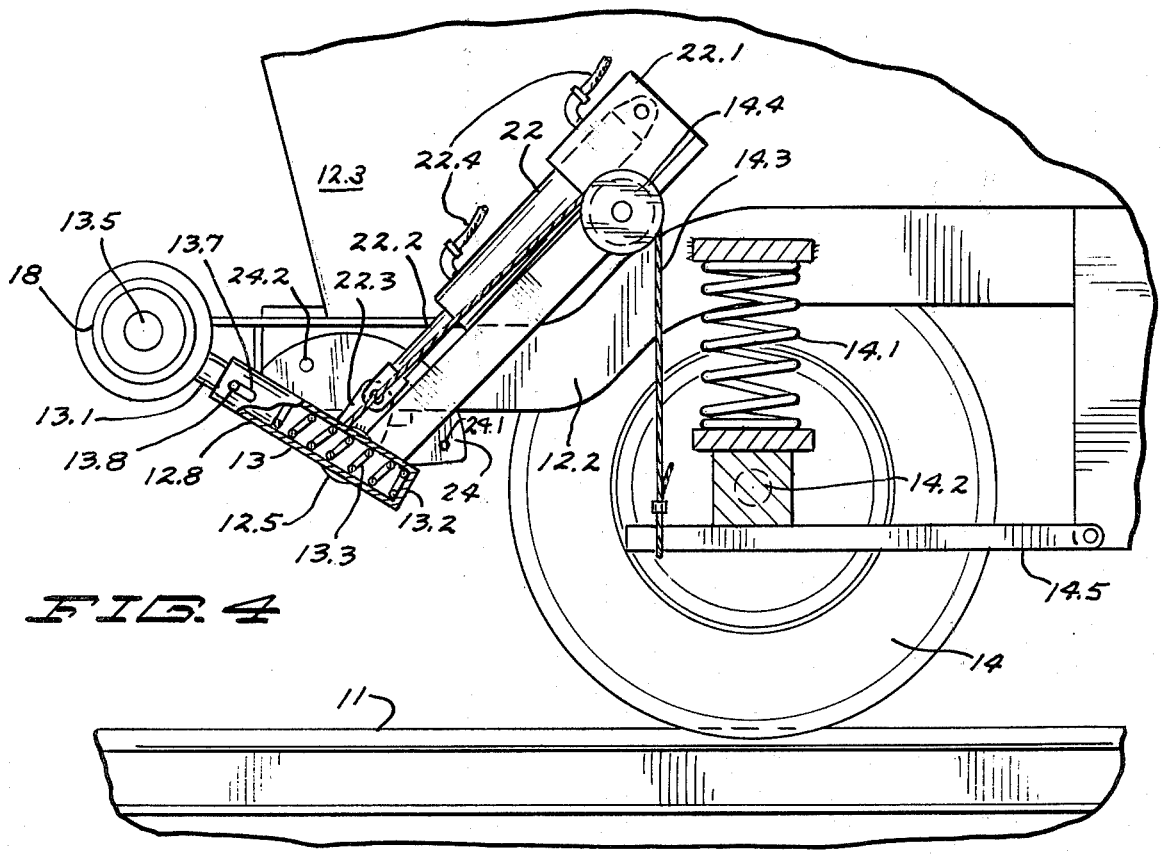

A pair of hydraulic cylinders 22 are mounted on either side of the longitudinal frames 12.1, 12.2, and are pivotally mounted to vehicle frame plates 22.1, as best seen in FIGS. 3 – 5. At their lower ends, the pistons 22.2 of the hydraulic cylinders 22 extend generally forwardly and downwardly for pivotal attachment to lugs 22.3 which are rigidly mounted, as by welding, to the rocker arm 12.6. The hydraulic cylinders preferably are double acting, as shown in the drawing, and are connected by means of lines 22.4 to a suitable source of hydraulic fluid under pressure. It will be understood that, as the piston 22.2 is extended from the hydraulic cylinder 22, as shown in FIG. 3, the rocker arm 12.6 is rotated in a counterclockwise direction, thereby moving the rail guide wheels 18 into contact with the rails 11. Retraction of the piston rod within the cylinder causes the rocker arm to pivot clockwise as shown in FIG. 4, retracting the rail guide wheels upwardly from the rail.

Locking means are provided to releasably lock the front guide wheels in their rail-contacting or retracted positions. Rigidly mounted, as by welding, to each end of the rocker arm 12.6 are segment plates 24 which are parallel to the frame beams 12.1, 12.2. Holes 24.1, 24.2 are provided in the segment plates and are positioned to become aligned with respective holes formed in the frame beams 12.1, 12.2 of the vehicle as the rail guide wheels are moved into their rail contacting position (FIG. 3) and as the guide wheels are fully retracted (FIG. 4). Pins 24.3 pass through the aligned holes in the segment plates and vehicle frame to lock the rocker arm in position with the guide wheels retracted or in contact with the rails. In this manner, any forces tending to rotate the rocker arm when the rail guide wheels are in their retracted or rail-contacting positions are resisted by means of the locking pins 24.3, rather than by the hydraulic cylinders. To the surface of the rocker arm sheath 12.7, near the center of the latter, is welded a bracket 24.4, as shown best in FIGS. 2 and 5. Pivotally attached to the bracket 24.4 is a handle 24.5, and rods 24.6 are mounted to the handle fore and aft, respectively, of its pivotal mounting to the bracket 24.4, the rods extending transversely of the vehicle and ending in the pins 24.3 such that movement of the handle 24.5 in a counterclockwise direction (FIG. 5) locks the pins 24.3 in the aligned holes of the frames and segment plates.

Referring now to FIGS. 3 – 5, the front tire suspension of the vehicle includes suspension springs such as helical springs 14.1, mounted between the tire axles 14.2 and the vehicle frame, the springs functioning in the usual manner to cushion movement between the frame of the vehicle and the tires 14. To move the front tires out of the way of the rail, and to keep the front tires from bouncing loosely as the vehicle travels a railroad track, we provide means for raising the axles 14.2 of the front tires tightly against the action of the springs 14.4, as the rail guide wheels 18 are swung downwardly into contact with the rail by the hydraulic cylinders and pistons. A length of strong but flexible cable such as steel cable 14.3 is provided for each of the front tires 14. Each cable is coupled at one end to the rocker arm adjacent one of its ends and is wound desirably at least once around the rocker arm, as shown best in FIG. 5. The cable then reaches upwardly and rearwardly over a frame-mounted sheave 14.4 and thence downwardly for coupling to the axle 14.2 of the front tire, the latter being afforded in FIGS. 3 and 4 by means of a lever 14.5 swingably attached at its rearward end to the frame and mounted at a point along its length to the tire axle 14.2. The cable 14.3 is of a length which permits the axle 14.2 free movement without cable interference when the rail guide wheel 18 is in its retracted position, but which holds the axle 14.2 tightly against the compressed suspension spring 14.1 when the rail guide wheel 18 is in its rail-contacting position. The spring 14.1 may be partially compressed, as shown in FIG. 3, or fully compressed, the spring and opposing cable restraining the front tire axle and tire from any appreciable movement as the vehicle travels on rails. The amount of vertical movement according the tire axle 14.2 corresponding to a given rotation of the rocker arm may be easily varied by varying, for example, the diameter of the rocker arm about which the cable 14.3 is wound.

FIGS. 6 and 7 show the rear guide wheel suspension, and it will be understood that this suspension is identical to that shown in commonly owned U.S. Pat. No. 3,738,285; the disclosure of which is incorporated herein by reference. For ease of understanding, the operation of the rear guide wheel suspension will now be explained briefly.

Referring to FIG. 7, the truck frame is shown generally as 12, and the rear axle of the rubber tires is depicted as 16.1. The rail guide wheels 20 are carried by the truck frame, rather than by the rear tire axle, but a cable assembly depicted generally as 30 in FIG. 7 is responsive to the relative elevation between the frame 12 and rear axle 16.1 of the truck so as to cause the rail guide wheels 20 to be pressed against the track with substantially a constant force regardless of the weight of the load carried in the truck bed.

A transverse shaft 30.1 extends between and is supported by side frames 12.1, 12.2 of the rear end of the truck. Pivotally mounted by brackets 30.2 at either end of the shaft 30.1 are rearwardly extending arms 30.3. A cross shaft 30.4 joins the rearward ends of the arms 30.3. Rear guide wheels 20 are mounted for rotation on axles 20.1, the axles being respectively housed in forwardly extending axle housings 20.2. Transverse rods 20.3 are mounted to the axle housings 20.2 and are spaced forwardly of the axles 20.1. At their confronting ends, the transverse rods 20.3 are respectively attached to the cross bar 30.4 by means of brackets 30.5 and torsion spring 30.6, the springs serving to independently urge the axle housings 20.2 to pivot downwardly about the transverse rods 20.3, and thereby press the rail guide wheels 20 against the rails 11.

Pivotally secured to the respective ends of the cross bar 30.1 are generally upright arms 32, each having a sheave 32.5 at its upper end. Extending generally upwardly from the rearward end of each of the arms 30.3 are interconnecting, pivotal links 32.1, 32.2 and 32.3, as shown best in FIG. 7. It will be understood that the downward force exerted by these links upon the arms 30.3 act directly upon the rear rail guide wheels 20. At its upper end, each link 32.3 is provided with a sheave, 32.4. Each of a pair of cable 32.6 is rigidly connected at one end to a rear tire axle 16.1, and passes thence upwardly over the sheave 32.5, rearwardly over the sheave 32.4, downwardly over a frame-mounted sheave 32.7, thence upwardly again over a transversely mounted sheave 32.8 and thence inwardly of the vehicle as shown in FIG. 6 for connection to the other cable through adjustable fastener 32.9. A cross bar 34.1 passes through the sheaves 32.4 on either side of the rear end of the vehicle, the cross bar being rigidly connected to the upper links 32.2.

Each cable 32.6, as it passes over the sheave 32.4, bears downwardly upon that sheave and upon the links 32.3, 32.2 and 32.1 to force the transverse rods 20.3 downwardly to urge the guide wheels 20 against the rail 11. As the truck becomes loaded down with equipment or other weighty material, the frame of the truck is lowered slightly with respect to the tire axle 16.1. As a result, the cable reach between the axle 16.1 and the sheave 32.5 decreases, thereby permitting a greater length of cable to traverse the path between the sheaves 32.5 and 32.7. In turn, the sheave 32.4 and hence the transverse rod 20.3 are permitted to raise with respect to the truck frame so that the transverse rod maintains a substantially constant elevation over the rail 11, resulting in a substantially constant force being exerted by the guide wheels on the rails. In similar fashion, it may be shown that if the truck bed is unloaded to greatly lighten the vehicle, the frame of the rear end of the truck will elevate with respect to the tire axle 16.1. The resulting longer cable reach between the axle 16.1 and sheave 32.5 ultimately results in a lowering of the transverse rod 20.3 with respect to the frame, thereby again tending to maintain a substantially constant pressure between the rail wheels and the rail.

For raising or lowering the rear guide wheels out of or into contact with the rails, a wrench handle 34 may be affixed to an outwardly exposed end of the cross bar 34.1. As the cross bar is rotated in the direction of the arrow 34.2, for example, (FIG. 7) the pivotal joint between the mating ends of the links 32.2 and 32.3 will swing upwardly in a semicicular path about the axis of the cross bar 34.1 to a stable position, thereby raising the guide wheel 20 from the tracks and holding the guide wheel in an upward, retracted position.

It should be noted that the rear tires of the vehicle are dual wheels, the outer wheels of which are generally aligned with the front wheels of the vehicle, and the inner wheels of which are spaced apart approximately the same distance as are the rails of the railroad track.

When the vehicle of the invention has been prepared for riding on railroad track rails, it will be understood that only the rear tires of the vehicle come into contact with the rails and provide traction for the vehicle. By virtue of the fact that the front of the vehicle is supported entirely by the guide wheels 18, the latter being spaced forwardly of the axle of the front tires, it can be shown that the weight of the vehicle is resultingly borne in greater proportion by the rear tires 16, thus improving traction between these tires and the rails.

Purely for example, assume that the vehicle and its load weigh 15,000 pounds and that the load is distributed so that when the vehicle is riding on the highway, the front tires 14 bear a total of 5,000 pounds and the rear tires 16 bear the remaining 10,000 pounds. If the vehicle, with this weight distribution, is now prepared for riding on rails, the front of the vehicle will be supported entirely by the guide wheels 18, which may be spaced forwardly of the front tire axle by a distance of, for example, 2½ feet. If we assume that the front and rear tire axles are separated by approximately 10 feet, then it follows that the weight borne by the guide wheels 18 will be approximately 4,000 pounds rather than 5,000 pounds. The approximately 1,000 pound difference is borne instead by the rear tires 16, since the rear guide wheels 20, as noted above, ordinarily exert a substantially constant load (e.g. 800 pounds each) upon the rails regardless of the weight of the truck load.

It will be understood that front guide wheel suspension of the invention may be employed with substantially any rear guide wheel suspension system. When used with a rear guide wheel suspension which causes the rear guide wheels to bear against the rails with a substantially constant force, the additional weight borne by the rear tires of the vehicle serves advantageously to increase the traction between these tires and the rails.

While we have described a preferred embodiment of the present invention, it should be understood that various changes, adaptations, and modifications may be made therein without departing from the spirit of the invention and the scope of the appended claims.

What is claimed:

1. In a combination highway and rail vehicle having a body and frame, front and rear tires mounted on axles connected through suspension springs to the frame and front and rear rail guide wheels contactable with rails of the railroad track, a front guide wheel suspension comprising mounting means mounting the front guide wheels to the frame and permitting the guide wheels to be moved downwardly into contact with the rails of a railroad track forwardly of the front tires so that the distance separating the front guide wheels from the rear tires is greater than the distance separating the front tires from the rear tires, and retraction means responsive to downward movement of the front rail guide wheels for retracting upwardly and holding the front tires against their suspension springs above the rails, the front rail guide wheels replacing the front tires for bearing weight at the front of the vehicle whereby a greater proportion of the vehicle weight is borne at the rear of the vehicle; and rear guide wheel mounting means mounting the rear rail guide wheels to the frame and including torsion spring means movable with respect to the body and urging the latter wheels downwardly against the rails, and capable means arranged with respect to the body and torsion spring means for maintaining substantially constant the downward force exerted by the torsion spring means on the guide wheels and by the latter upon the rails substantially independent of the weight borne by the tires and guide wheels at the rear of the vehicle, whereby the rear guide wheel mounting means cooperates with the front guide wheel suspension to cause the rear tires of the vehicle substantially alone to bear said greater proportion of the vehicle weight, increasing traction between the rear tires and rails upon which they ride.

2. The vehicle of claim 1 wherein the mounting means comprises a frame-mounted, transverse, rotatable rocker arm and guide wheel support arms mounted to respective ends of the rocker arm and mounting the guide wheels at their ends, and wherein the retraction means comprises cables passing respectively over frame-mounted sheaves above the front tire axles and coupling the latter to the rocker arm, each cable being so arranged as to wind about the rocker arm and thus shorten its reach as the rocker arm is rotated to lower the guide wheels, thereby concurrently lifting the front tire axles upwardly against their respective suspension springs.

3. The vehicle of claim 2 wherein the front guide wheel suspension includes at least one hydraulic cylinder and piston mounted between the rocker arm and the frame and positioned to rotate the rocker arm and carry the front guide wheels between a rail-contacting position for rail travel and a retracted position for highway travel.

4. The vehicle of claim 3 including releasable locking means locking the rocker arm against rotation when the front guide wheels are in their rail-contacting or retracted positions.

5. In a combination highway and rail vehicle having a body and frame, front and rear tires mounted on axles connected through suspension springs to the frame, and front and rear rail guide wheels contactable with rails of a railroad track to guide the vehicle thereon;

a front guide wheel suspension comprising a frame-mounted, rotatable, transverse rocker arm, guide wheel support arms mounted to respective ends of the rocker arm and mounting the front guide wheels at their ends and carrying the front guide wheels between an upper, retracted position and a lower, rail contacting position spaced forwardly of the front tires in response to rotation of the rocker arm so that the distance separating the front guide wheels from the rear tires is greater than the distance separating the front tires from the rear tires, frame-mounted sheaves above the front tire axles, and cables respectively coupling the front tire axles to the rocker arm and arranged to pass over the sheaves and to wind about the rocker arm as the rocker arm is rotated to lower the guide wheels, thereby concurrently lifting the front tire axles upwardly against their suspension springs, the front guide wheels replacing the front tires for bearing weight at the front of the vehicle and causing a greater proportion of the vehicle weight to be borne at the rear of the vehicle, and rear guide wheel mounting means mounting the rear guide wheels to the frame and including torsion springs means movable with respect to the body and urging the rail guide wheels downwardly against the rails, and cable means arranged with respect to the body and torsion spring means for maintaining substantially constant the downward force exerted by the torsion spring means on the guide wheels and by the latter upon the rails substantially independent of the load at the rear of the vehicle, whereby said greater proportion of the vehicle weight is borne substantially alone by the rear tires to increase traction between the latter and rails upon which they ride.

6. The vehicle of claim 5 including at least one hydraulic cylinder mounted between the rocker arm and frame and arranged to rotate the rocker arm to carry the front guide wheels between a rail contacting position for rail travel and a retracted position for highway travel, the rocker arm and frame including cooperating latching elements for releasably locking the front guide wheels in their rail-contacting and retracted positions.

7. The vehicle of claim 6 wherein each front guide wheel support arm includes a tube mounted to the rocker arm and a rod received telescopingly within the tube and having an outwardly extending end mounting a rail guide wheel, and a helical spring within the tube and biasing the rod outwardly thereof to maintain continuous contact between the guide wheel and a rail upon which it rides.

8. In a combination highway and rail vehicle having a body and frame, front and rear tires mounted on axles, suspension springs joining the axles to the frame, and front and rear rail guide wheels contactable with rails of a railroad track to guide the vehicle on the track;

rear guide wheel mounting means mounting the rear guide wheels to the frame for moving the rear guide wheels between rail contacting and retracted positions for vehicle movement on rails and on a highway, respectively, and including torsion spring means and cable means arranged with respect to the body and torsion spring means for maintaining substantially constant the downward force exerted by the torsion spring means on the guide wheels and by the latter upon the rails substantially independent of the load at the rear of the vehicle; and a front guide wheel suspension comprising a transverse rocker arm mounted for rotation to the frame forwardly of the front tire axles and having outwardly extending lugs adjacent its ends, support arms each comprising a tube having one closed end rigidly mounted to an end of the rocker arm, a rod slidingly received in the tube, a helical spring mounted in the tube to urge the rod outwardly therefrom, and a pin carried by the rod and protruding through a longitudinal slot in the tube to limit outward movement of the rod, a transverse support bar joining outwardly extending ends of the rods; rail guide wheel axles mounting guide wheels and mounted to the transverse support bar, hydraulic cylinders mounted between the vehicle frame and the rocker arm lugs for rotating the rocker arm to carry the front rail guide wheels between a lower, rail-contacting position spaced forwardly of the front tires and an upper retracted position above the rails, sheaves mounted to the vehicle frame above the front tire axles, cables each coupled at one end to a front tire axle and passing over one of the sheaves and attached at its other end to the rocker arm for winding around the rocker arm when the latter is rotated thereby to carry the front guide wheels into contact with rails and to concurrently raise the front tire axles against their suspension springs and elevate the front tires above rail level, the front guide wheels replacing the front tires for bearing weight at the front of the vehicle so that the distance separating the front guide wheels from the rear tires is greater than the distance separating the front tires from the rear tires, and causing the rear tires to bear a larger proportion of the weight to increase traction between the rear tires and rails upon which they ride.

* * * * *

UNITED STATES PATENT OFFICE
CERTIFICATE OF CORRECTION

Patent No. 3,980,025        Dated September 14, 1976

Inventor(s) Buford W. Olson, Sr.; Eldrid W. Nelson; Albin A. Davidson.

It is certified that error appears in the above-identified patent and that said Letters Patent are hereby corrected as shown below:

In claim 1, column 6, line 62, delete "capable", and substitute --cable--.

Signed and Sealed this

Twenty-third Day of November 1976

[SEAL]

Attest:

RUTH C. MASON
Attesting Officer

C. MARSHALL DANN
Commissioner of Patents and Trademarks